United States Patent Office 3,497,490
Patented Feb. 24, 1970

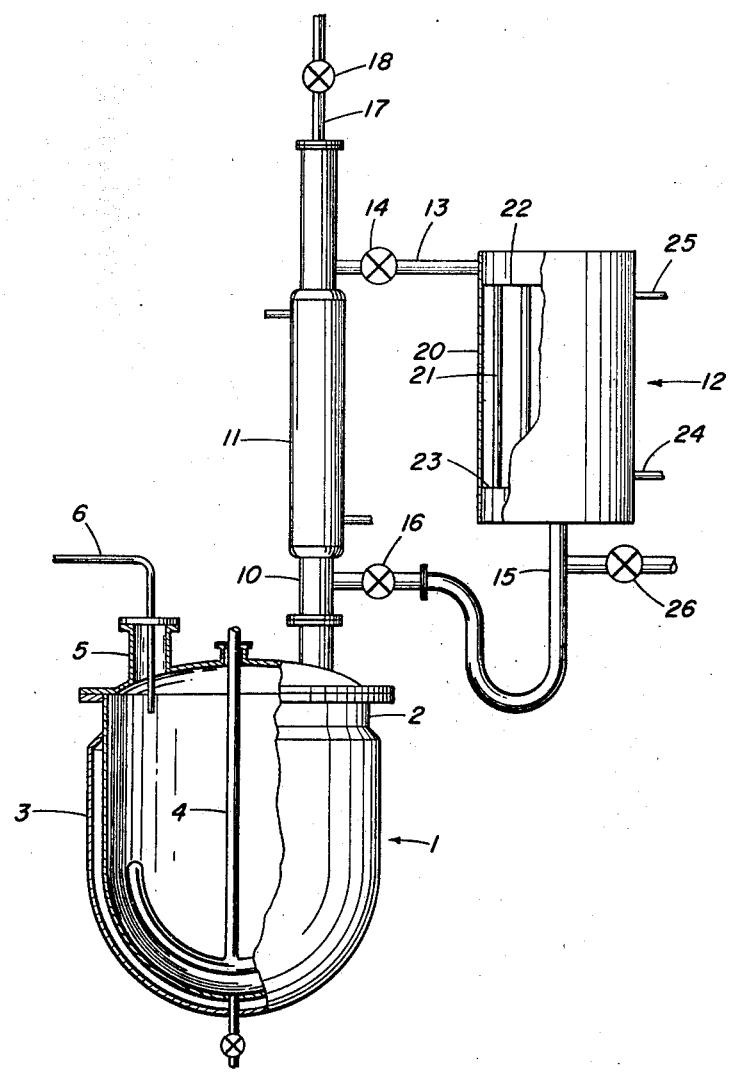

3,497,490
MALEATION OF TALL OIL ROSINS
Herbert George Arlt, Jr., Ridgefield, Conn., and John Thomas Geoghegan, Port Chester, N.Y., assignors, by mesne assignments, to Arizona Chemical Company, New York, N.Y., a corporation of Delaware
Filed Nov. 13, 1967, Ser. No. 682,201
Int. Cl. C07c *69/74, 61/30*
U.S. Cl. 260—97.5
3 Claims

ABSTRACT OF THE DISCLOSURE

In the maleation or fumaration of tall oil rosin at elevated temperatures, the formation of sublimates is avoided by incorporating small amounts of a saturated lower aliphatic monocarboxylic acid or an anhydride thereof.

This invention relates to the manufacture of high acid number tall oil rosins and polyhydric alcohol esters thereof by reacting these rosins with alpha-beta unsaturated lower olefin dicarboxylic acids or anhydrides such as maleic acid or anhydride or fumaric acid. More particularly, the invention provides an improvement in these processes wherein a small but effective amount of a lower saturated aliphatic monocarboxylic acid or an anhydride thereof is present in the reaction to avoid difficulties due to the evolution of a sublimate.

The modification of rosin by Diels-Alder condensation with alpha-beta unsaturated olefin dicarboxylic acids such as maleic acid or anhydride is used for several purposes. When relatively large proportions of aliphatic dicarboxylic acid or anhydride are used, such as about 5% to 25% on the weight of the rosin, adducts are obtained that are useful in the preparation of varnishes, lacquers and inks. Thus, for example, rosin-maleic acid adducts containing about 5% to 15% of maleic acid have high acid numbers on the order of 260–330 and are used in steam-set inks and, after esterification with glycerol, ethylene glycol, pentaerythritol or other polyhydric alcohols, in the preparation of varnishes, lacquers, floor polishes and other surface coatings.

Frequently surface coating resins of this type are made by reacting the three reagents together in a single-step process. This can be done in a resin kettle equipped with a reflux condenser because the Diels-Alder condensation between the rosin and maleic acid or anhydride takes place along with the esterification reaction or ahead of it. Sublimate formation is encountered when tall oil rosin is used in this process, but can be controlled by applying the principles of the present invention.

Adducts of rosin with maleic acid, fumaric acid, itaconic acid and the like that contain lower proportions of the dicarboxylic acid such as about 1% to 6%, are used in preparing fortified paper sizes as is described, for for example, in U.S. Patent No. 2,628,918. In preparing these rosin products, as in making the varnish resins described above, it is customary to heat the reagents together at temperatures of 150°–250° C. and preferably at about 160° C.–230° C. until the adduct formation is complete, which may require from 30 minutes to 2–3 hours.

Originally, the rosin used in these processes was either gum rosin or wood rosin. Within recent years, however, the supply of these rosins has declined, whereas more and more tall oil rosin has become available at substantially lower prices. Efforts have been made, therefore, to substitute tall oil rosin in the maleation or fumaration process, but an unexpected difficulty has been encountered. This was the evolution of a yellow sublimate during the time that the reaction mixture was at temperatures above about 150° C. This sublimate tends to plug overhead lines, condensers, and vents, thus interfering with the process and constituting a serious industrial safety hazard. It is a principal object of our present invention to overcome or suppress this sublimate evolution.

We have found that the presence of small but effective amounts of a lower saturated aliphatic monocarboxylic acid or an anhydride thereof in the reaction mixture will serve effectively to prevent the evolution of this sublimate. In its broadest aspects, our invention, therefore, comprises the reaction of tall oil rosin with any alpha-beta unsaturated lower olefin dicarboxylic acid, or with an anhydride thereof, with or without the presence of a polyhydric alcohol, at temperatures where the use of tall oil rosin would ordinarily cause a sublimate to form, but in the presence of a lower paraffin monocarboxylic acid or anhydride inhibiting such sublimation. Preferably, the olefin dicarboxylic acid is maleic acid or maleic anhydride, or fumaric acid, or a mixture of any two or more, since these are the acids in general commercial use. The lower monocarboxylic acid is preferably acetic acid or propionic acid or an anhydride thereof, since these are both cheap and effective, but other volatile lower alkyl monocarboxylic acids or anhydrides may be used.

The invention will be further described with reference to the accompanying drawing, the single figure of which is a front elevation, with parts broken away, of a resin kettle and reflux condenser of the type now used for carrying out the processes dealt with by the present invention.

Referring to this drawing the resin kettle indicated generally by reference numeral 1 includes a kettle body 2 preferably formed of stainless steel sheet metal and surrounded by a jacket 3 for the admission of superheated steam, Dowtherm or other heating fluid. The kettle is equipped internally with an agitator 4 and its charging orifice 5 may be provided with an inlet tube 6 for the admission of nitrogen, carbon dioxide or other blanketing gas to exclude oxygen while the condensation is proceeding.

The kettle 1 has a vapor outlet line 10, preferably surrounded by a cooling jacket 11 and attached to a reflux condenser 12 by means of a vapor line 13 containing a valve 14 and a condensate line 15 provided with a valve 16. The line 10 preferably has a pressure relief line 17, equipped with a valve 18, at its upper end for controlling the pressure conditions in the system.

When the equipment is being used to produce a maleated or fumarated rosin the valves 14 and 16 are usually shut and the valve 18 is completely or partially open. Vapors rising through line 10 are condensed by the cooling action of water flowing through the jacket 11, and are returned to the kettle. It is very important, however, to keep the relief line 17 and its valve 18 open in order to prevent dangerous back pressure from developing in the system.

The reflux condenser 12 is used when a polyhydric alcohol such as ethylene glycol, polyethylene glycol, propylene glycol and the like is being reacted with rosin and maleic or fumaric acid or maleic anhydride in the resin kettle, the valves 14 and 16 then being open. In the embodiment shown it comprises a cylindrical shell 20 containing tubes 21 mounted between upper and lower tube sheets 22 and 23 and adapted to condense vapors by the cooling action of water or steam flowing through the shell between inlet 24 and outlet 25. The condensate line 15 preferably contains a valved side outlet 26 through which a part or all of these condensed vapors may be withdrawn if desired.

In use, the kettle 1 is charged with solid or molten tall oil rosin, the dicarboxylic acid or anhydride is added, and atmospheric air is excluded by introducing a blanketing gas through the line 6. Heating fluid is admitted to the jacket 3 and the condensation reaction begins after the temperature of the charge has reached about 125° C.–150° C., depending on the type and amount of dicarboxylic acid present. If no monocarboxylic acid or anhydride has been added, i.e., if the present invention is not being used, a volatile yellow material soon begins to form, and its evolution increases as the reaction temperature is raised. The exact composition of this material has not been determined, but it is known to contain tall oil rosin. Thus sublimate rises through the vapor line 10 and tends to clog the relief line 17 and its valve 18, and after continued or repeated operations it may even plug the line 10 itself. When valves 14 and 16 are open it also settles in the condenser 12 and soon begins to plug the tubes 21. Such plugging interferes seriously with proper functioning of the equipment and may quickly become an explosion hazard.

When the operation is conducted in accordance with our invention there is added to the kettle 1 along with the tall oil rosin, a small quantity of acetic anhydride, propionic anhydride, acetic or propionic acid or other lower saturated aliphatic monocarboxylic acid. The exact quantity to be added may vary with the particular acid or anhydride used, as well as with the reaction conditions to be maintained in the kettle 1, but will ordinarily be within the range of 0.1% to about 0.5–1.5%, based on the weight of the tall oil rosin. These quantities are hereinafter sometimes designated as sublimate-inhibiting quantities of these monocarboxylic acid substances. The effect of this addition is to prevent the appearance of the sublimate during the condensation reaction, so that the danger of plugging the equipment is completely avoided.

Instead of adding the monocarboxylic acid or its anhydride to the reaction vessel, as described, it may be premixed with the tall oil rosin or with the maleic acid or anhydride or fumaric acid. We prefer to mix it with the tall oil rosin, usually in amounts of about 0.1% to 1.5% by weight. Such an admixture will provide a new tall oil rosin product that is especially adapted for maleation or fumaration, and can be sold commercially as a direct replacement for the wood rosin or gum rosin previously used for these purposes and at a substantial saving in cost.

It will be understood that the problem dealt with by our invention is encountered only with tall oil rosin. No sublimate is formed when either wood rosin or gum rosin is maleated or fumarated at the condensation temperatures described above, and there is no problem of plugging the equipment. It is only when tall oil rosin is reacted with an alpha-beta unsaturated aliphatic dicarboxylic acid that the sublimate forms and the addition of a lower aliphatic monocarboxylic acid or anhydride becomes necessary.

The invention will be further described and illustrated by the following specific examples. It will be understood, however, that although these examples may describe certain preferred embodiments, the invention in its broadest aspects is not limited thereto.

Example 1

The kettle shown on the drawing was charged with 300 pounds of a tall oil rosin sold commercially as "Acintol R" Tall Oil Rosin, Type S, a high-quality WW rosin having an acid value of 172, a saponification value of 180 and a softening point of 79° C. This was melted, 42 pounds of maleic anhydride were added, and the mixture was agitated and kept under a blanket of nitrogen admitted through the line 6.

The charge was heated slowly to 230° C. and held at this temperature while the rosin-maleic anhydride reaction progressed, the valves 14 and 16 being closed. A yellow sublimate soon began to form, however, and after about one hour at 230° C. it plugged the vapor lines 10 and 17 to such an extent that the reaction could not safely be continued. The run was discontinued at this point.

Example 2

A second run was made in the same equipment, after cleaning, with the same quantities of the same tall oil rosin and maleic anhydride. In this run, however, 2 pounds of acetic anhydride, 0.66% on the weight of the rosin, was added to the mixture before the heating.

The mixture was heated slowly to 230° C. as before, and was maintained at this temperature under nitrogen and with agitation for a period of two hours, after which time a rosin-maleic adduct of high acid number was obtained. There was no plugging of the vapor line 10 during this run and no sublimate was found when it was inspected after the run was completed.

Example 3

In a preliminary experiment a 500 ml. three-neck flask, equipped with a stirrer, a condenser, a thermometer and a nitrogen inlet, was charged with 300 grams of the tall oil rosin described in Example 1 and 30 grams of fumaric acid. The flask was heated slowly to 230° C. while stirring and maintaining a nitrogen blanket therein. Reaction between the fumaric acid and the tall oil rosin began quickly, but a yellow sublimate was again formed. This amounted to 2 grams after one hour at 230° C., at which point the reaction was discontinued.

In a second run the same ingredients were reacted in the same equipment, but 2 grams of acetic anhydride was added. The reaction was carried to completion successfully by heating slowly to 230° C. and holding at this temperature for about two hours. No sublimate was noted in the reaction flask or condenser.

Example 4

The procedure of Example 2 was followed, but 2.5 pounds of propionic anhydride was substituted for the acetic anhydride. No sublimate was encountered, and the cooled tricarboxylic acid product was equal in quality to that obtained when acetic anhydride was used.

In another run, 2.4 pounds of acetic acid was substituted for the acetic anhydride of Example 2, the quantities and conditions otherwise being the same. The equipment remained free from sublimate, and an equally good product was obtained.

Example 5

Runs were made in the laboratory equipment of Example 3 using 300 grams of the same tall oil rosin and 42 grams of maleic anhydride together with 2.5 grams of either butyric acid or neopentanoic acid. In both cases a satisfactory product was obtained without the formation of a sublimate although the butyric acid imparted a definite odor to the material.

Example 6

A 300 gram portion of tall oil rosin was melted under a nitrogen blanket and 2 grams of acetic anhydride were added. The mixture was then heated at 150° C. with stirring for 30 minutes, after which it was cooled and the rosin solidified.

When this rosin was later reacted with maleic anhydride by heating to 150° C., adding about 5% to 15% of maleic anhydride on the weight of the mixture and heating with agitation to 200°–230° C., no sublimate was formed. This indicates that a commercially acceptable tall oil rosin product, especially adapted for Diels-Alder maleation or fumaration without sublimate formation, can be obtained simply by blending with the rosin small but effective amounts of a lower aliphatic carboxylic acid or an anhydride thereof, these amounts being in the range of about 0.1% to about 1.5%.

What we claim is:

1. In the manufacture of high acid number tall oil rosins by the reaction of tall oil rosin with an alpha-beta unsaturated lower olefin dicarboxylic acid or an anhydride thereof at temperatures within the range of about 150° C. to about 250° C. the improvement which comprises inhibiting the evolution of sublimate from the reaction mixture by carrying out said reaction in the presence of an effective amount, within the range of about 0.1% to about 1.5% of a member of the group consisting of lower saturated aliphatic monocarboxylic acids and anhydrides thereof.

2. A method according to claim 1 wherein the alpha-beta unsaturated lower aliphatic dicarboxylic acid is a member of the group consisting of maleic acid, maleic anhydride, and fumaric acid.

3. A method according to claim 2 wherein the sublimate-inhibitor is a member of the group consisting of acetic acid, propionic acid, and anhydrides thereof.

References Cited
UNITED STATES PATENTS

| | | | |
|---|---|---|---|
| 1,937,865 | 9/1934 | Byrkit | 260—100 |
| 2,039,243 | 4/1936 | Krizikalla et al. | 260—101 |
| 2,538,103 | 1/1951 | Koonce et al. | 260—101 |
| 3,106,550 | 10/1963 | Bitting et al. | 260—101 |

DONALD E. CZAJA, Primary Examiner

WILLIAM E. PARKER, Assistant Examiner

U.S. Cl. X.R.

260—107